(12) United States Patent
Sobrier

(10) Patent No.: US 9,065,850 B1
(45) Date of Patent: Jun. 23, 2015

(54) PHISHING DETECTION SYSTEMS AND METHODS

(75) Inventor: Julien Sobrier, Campbell, CA (US)

(73) Assignee: Zscaler, Inc., San Jose, CA (US)

(*) Notice: Subject to any disclaimer, the term of this patent is extended or adjusted under 35 U.S.C. 154(b) by 513 days.

(21) Appl. No.: 13/022,352

(22) Filed: Feb. 7, 2011

(51) Int. Cl.
*H04L 29/06* (2006.01)

(52) U.S. Cl.
CPC .................................. *H04L 63/1483* (2013.01)

(58) Field of Classification Search
CPC ...................... H04L 63/1483; G06F 17/30864
USPC ...................................................... 726/22–25
See application file for complete search history.

(56) References Cited

U.S. PATENT DOCUMENTS

| | | | | |
|---|---|---|---|---|
| 7,562,304 | B2 * | 7/2009 | Dixon et al. | 715/738 |
| 7,630,987 | B1 * | 12/2009 | Renfro et al. | 1/1 |
| 7,634,810 | B2 * | 12/2009 | Goodman et al. | 726/22 |
| 7,668,921 | B2 | 2/2010 | Proux et al. | |
| 7,681,234 | B2 * | 3/2010 | Florencio et al. | 726/22 |
| 7,854,001 | B1 * | 12/2010 | Chen et al. | 726/22 |
| 7,925,883 | B2 * | 4/2011 | Florencio et al. | 713/178 |
| 8,245,304 | B1 * | 8/2012 | Chen et al. | 726/26 |
| 8,291,065 | B2 * | 10/2012 | Goodman et al. | 709/224 |
| 8,468,597 | B1 * | 6/2013 | Warner et al. | 726/22 |
| 2006/0080735 | A1 * | 4/2006 | Brinson et al. | 726/22 |
| 2006/0123464 | A1 * | 6/2006 | Goodman et al. | 726/2 |
| 2006/0123478 | A1 * | 6/2006 | Rehfuss et al. | 726/22 |
| 2007/0005984 | A1 * | 1/2007 | Florencio et al. | 713/178 |
| 2007/0006305 | A1 * | 1/2007 | Florencio et al. | 726/22 |
| 2007/0028291 | A1 | 2/2007 | Brennan et al. | |
| 2007/0033639 | A1 * | 2/2007 | Goodman et al. | 726/2 |
| 2007/0039038 | A1 * | 2/2007 | Goodman et al. | 726/2 |
| 2007/0168533 | A1 | 7/2007 | Canright et al. | |
| 2007/0192855 | A1 | 8/2007 | Hulten et al. | |
| 2007/0199054 | A1 | 8/2007 | Florencio et al. | |
| 2007/0245422 | A1 * | 10/2007 | Hwang et al. | 726/26 |
| 2007/0294391 | A1 | 12/2007 | Kohn | |
| 2008/0034425 | A1 | 2/2008 | Overcash et al. | |
| 2008/0034428 | A1 | 2/2008 | Bejar et al. | |
| 2008/0046738 | A1 | 2/2008 | Galloway et al. | |
| 2008/0162449 | A1 * | 7/2008 | Chao-Yu et al. | 707/5 |
| 2008/0163369 | A1 | 7/2008 | Chang et al. | |

(Continued)

OTHER PUBLICATIONS

Zhang et al.; Cantina: a content-based approach to detecting phishing web sites; Published in: Proceeding WWW '07 Proceedings of the 16th international conference on World Wide Web; 2007; pp. 639-648; ACM Digital Library.*

(Continued)

*Primary Examiner* — Bradley Holder
(74) *Attorney, Agent, or Firm* — Clements Bernard PLLC; Lawrence A. Baratta, Jr.; Christopher L. Bernard

(57) ABSTRACT

The present disclosure provides phishing heuristic systems and methods that detect phishing sites. The present invention may be implemented via a server connected to the Internet, via a distributed security system, and the like. Phishing sites may be detected in a single transaction, i.e. client request plus server reply, while knowing as little as possible about the site being masqueraded. In an exemplary embodiment, a phishing site detection system and method utilized three steps—whitelisting, blacklisting, and scoring. For example, if a particular page meets all requirements of blacklisting without any elements of whitelisting and has a score over a particular threshold, that particular site may be designated as a phishing page.

16 Claims, 5 Drawing Sheets

(56) References Cited

U.S. PATENT DOCUMENTS

| | | | |
|---|---|---|---|
| 2009/0077383 A1* | 3/2009 | de Monseignat et al. | 713/175 |
| 2009/0089859 A1* | 4/2009 | Cook et al. | 726/3 |
| 2009/0144308 A1 | 6/2009 | Huie et al. | |
| 2009/0157675 A1* | 6/2009 | Stellhorn et al. | 707/6 |
| 2009/0300045 A1 | 12/2009 | Chaudhry et al. | |
| 2009/0300768 A1 | 12/2009 | Krishnamurthy et al. | |
| 2010/0023762 A1 | 1/2010 | Kailash et al. | |
| 2010/0095375 A1* | 4/2010 | Krishnamurthy et al. | 726/22 |
| 2010/0205215 A1* | 8/2010 | Cook et al. | 707/781 |

OTHER PUBLICATIONS

Fu et al.; Detecting Phishing Web Pages with Visual Similarity Assessment Based on Earth Movers Distance (EMD); Published in: Dependable and Secure Computing, IEEE Transactions on (vol. 3, Issue: 4 ); pp. 301-311; Date of Publication : Oct.-Dec. 2006; IEEE Xplore.*

* cited by examiner

PHISHING DETECTION SYSTEMS AND METHODS

FIELD OF THE INVENTION

The present invention relates generally to computer security systems and methods. More particularly, the present invention relates to phishing heuristic systems and methods that detect phishing sites over a network, e.g. the Internet.

BACKGROUND OF THE INVENTION

Conventionally, most security products such as firewalls, Virtual Private Networks (VPNs), Intrusion Detection Systems (IDS), Intrusion Prevention Systems (IPS), etc. protect corporate servers from threats coming from the Internet. Newer threats infect end users, i.e. who are accessing Internet resources, via bots, phishing and malicious active content, viruses, spyware, etc. all of which subsequently infect corporate networks. Corporations, service providers, enterprises, etc. have done very little to inspect user-initiated traffic and protect their users and networks therefrom. An enterprise, for example, may implement security measures by use of a layered security system. Such a layered security system may be implemented at the network edge of the enterprise, e.g., firewalls, gateway security agents, etc. Additionally, a layered security system may also include security processes and agents that are implemented throughout the enterprises, e.g., virus scanning software on each computer within the enterprise, content filtering software, content monitoring software, etc. However, layered security systems are prone to processing inefficiencies and may require many resources within the enterprise to maintain the systems. For example, an enterprise may have a multi-layered security system deployed within its network. A file received on the enterprise's computers may be processed by a content filtering system, an intrusion detection system and pass through the enterprise's firewall to each computer that receives the file. Furthermore, each computer may include virus scanning software that may scan the file when it is received. Thus, regardless of the file integrity, each file may potentially be inspected multiple times by multiple processes, causing processing delays. Thus, while the objective of protecting the enterprise is met, it is nevertheless met in a relatively inefficient manner.

Additionally, many of these layered defenses operate independently and do not provide feedback to different security layers. For example, the virus scanning software the enterprise uses may not be able to communicate with the enterprise's firewall. Thus the firewall may continue to pass the infected file, and each computer that receives the infected file will expend resources performing security operations, and each user of those computers will likewise spend time to perform manual remedial actions in response to the security threat. Many layered security systems do not implement a distribution infrastructure to communicate and share content intelligence. This results in repeated processing of both good and bad content. For example, information related to a virus outbreak detected in an enterprise location cannot be readily propagated to a central office or other branches of the enterprise; uniform resource locators (URLs) found to include malicious software ("malware") or objectionable content cannot be readily propagated to a central office or other branches of the enterprises, etc. Many layered security systems also cannot readily maintain a central data store of threat data that classifies content items such as files, URLs, e-mails according to security classifications (e.g. virus, malware, spam mail, etc.).

Phishing is the fraudulent process of attempting to acquire sensitive information from computer users such as usernames, passwords, payment detail, personal identification information, etc. by masquerading as a trustworthy entity in an electronic communication. For example, communications purporting to be from popular social web sites, auction sites, online payment processors, banks or other financial institutions, etc. are commonly used to lure unsuspecting users. Phishing is typically carried out by e-mail, instant messaging, etc., and it often directs users to enter details at a fake website whose look and feel are almost identical to a legitimate one. Phishing is an example of social engineering techniques used to fool users, and exploits the poor usability of current web security technologies. For example, emails, supposedly from the Internal Revenue Service, have been used to glean sensitive data from U.S. taxpayers. Most methods of phishing use some form of technical deception designed to make a link appear to belong to the spoofed organization. Misspelled URLs or the use of subdomains are common tricks used by phishers. In the following example URL, www.yourbank.example.com/, it appears as though the URL will take you to the example section of the yourbank website; actually this URL points to the "yourbank" (i.e. phishing) section of the example website. Another common trick is to make the displayed text for a link (the text between the <A> tags) suggest a reliable destination, when the link actually goes to a phishers' site.

BRIEF SUMMARY OF THE INVENTION

In an exemplary embodiment, a phishing site detection method includes a) determining if a site should be excluded as one of a plurality of phishing sites based on one or more exclusion elements; b) determining if the site should be included as one of the plurality of phishing sites based on one or more inclusion elements; and c) if the site is not excluded based on step a) and is included based on step b), scoring the site based on a plurality of phishing elements to determine if the site is one of the plurality of phishing sites. In another exemplary embodiment, a phishing site detection system includes a data store; a network interface communicatively coupled to a network; a processor, wherein the data store, the network interface, and the processor are communicatively coupled therebetween, and wherein the processor is configured to: a) determine if a site on the network should be excluded as one of a plurality of phishing sites based on one or more exclusion elements, wherein the plurality of phishing sites is stored in a database in the data store; b) determine if the site should be included as one of the plurality of phishing sites based on one or more inclusion elements; c) if the site is not excluded based on step a) and is included based on step b), score the site based on a plurality of phishing elements to determine if the site is one of the plurality of phishing sites; and d) update the plurality of phishing sites based on step c). In yet another exemplary embodiment, a network security system includes a processing node communicatively coupled to a user and to an external network, wherein the processing node includes a data store storing security policy data for the user, data inspection engines configured to perform threat detection classification on content to the user from the external network, and a manager communicatively coupled to the data store and the data inspection engines; and an authority node communicatively coupled to the processing node, wherein the authority node includes a data store storing security policy data including a list of phishing sites in the external network; wherein the processing node and the authority node are configured to detect phishing sites and update the list of phishing sites based thereon; and wherein the processing node is configured to prevent the user from accessing one of the list of phishing sites.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to phishing heuristic systems and methods that detect phishing sites. The present invention may be implemented via a server connected to the Internet, via a distributed security system, and the like. Phishing sites may be detected in a single transaction, i.e. client request plus server reply, while knowing as little as possible about the site being masqueraded. In an exemplary embodiment, a phishing site detection system and method utilized three steps—whitelisting, blacklisting, and scoring. For example, whitelisting may provide a filter to remove pages from the phishing site detection system, blacking may provide another filter to remove pages from the phishing site detection system, and the scoring may be performed on any remaining pages. That is, if a particular page meets all requirements of blacklisting without any elements of whitelisting and has a score over a particular threshold, that particular site may be designated as a phishing page. Upon designation, pages marked as phishing pages may be blocked or preceded by a warning.

Figure 1:
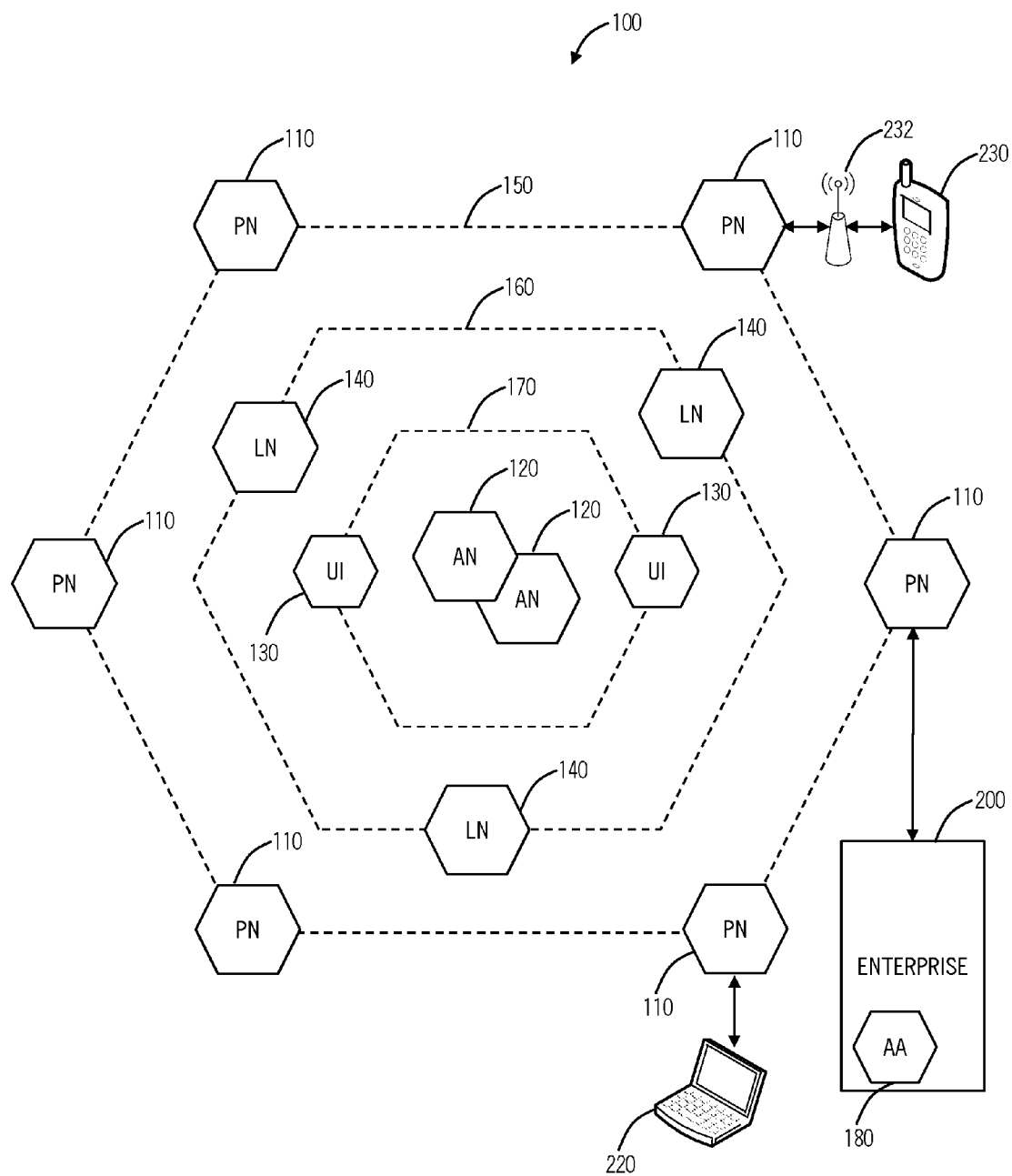
FIG. 1 is a block diagram of a distributed security system which may be utilized with the phishing site detection systems and methods of the present invention.

Referring to FIG. 1, in an exemplary embodiment, a block diagram illustrates of a distributed security system 100. The system 100 may, for example, be implemented as an overlay network in a wide area network (WAN), such as the Internet, a local area network (LAN), or the like. The system 100 includes content processing nodes (PN_ 110 that proactively detect and preclude the distribution of security threats, e.g., malware, spyware, viruses, etc., and other undesirable content sent from or requested by an external system. Example external systems can include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an e-mail message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only e-mail, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
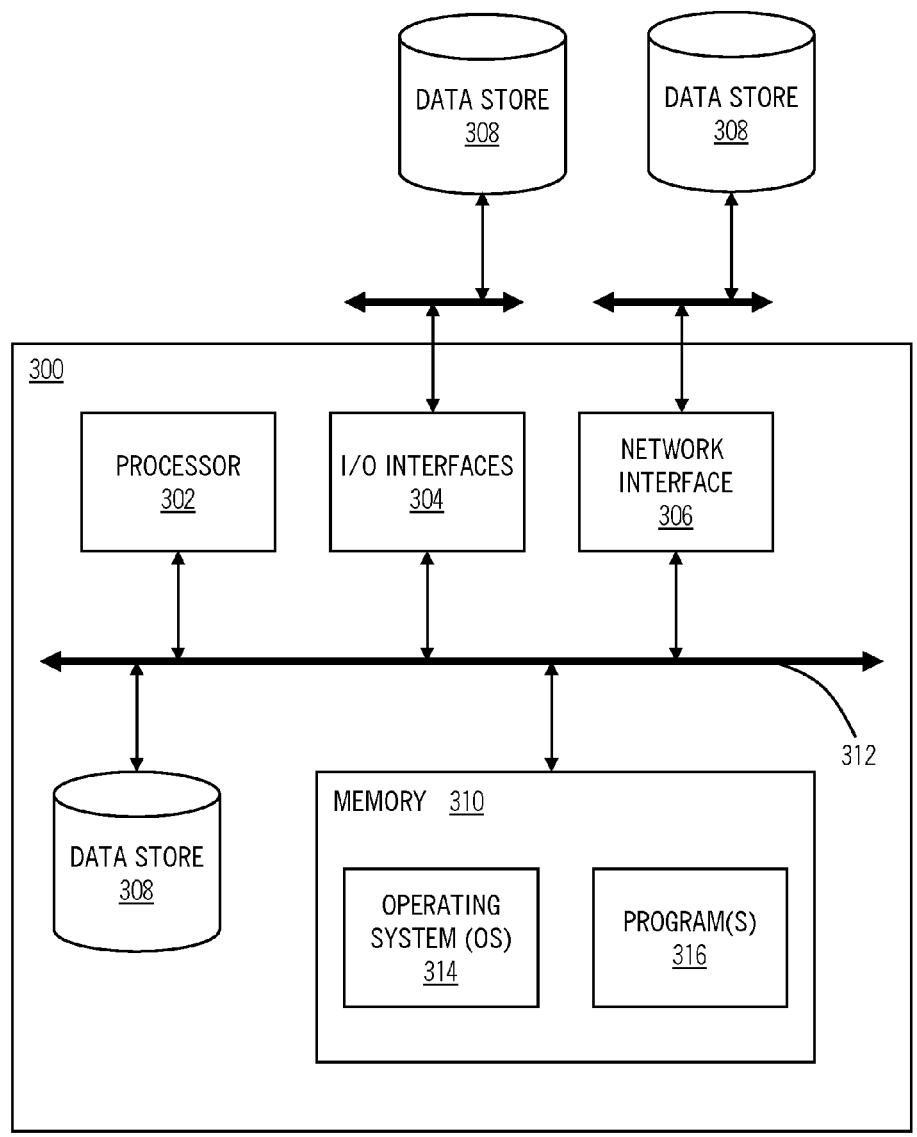
FIG. 3 is a block diagram of a server which may be used in the distributed security system of FIG. 1 or standalone in performing phishing detection.

Each of the processing nodes 110 may be implemented by one or more of computer and communication devices, e.g., server computers, gateways, switches, etc, such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc may be configured to establish communications through the nearest (in traffic communication time) processing node 110. A mobile device 230 may be configured to communicated to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may can, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam e-mail domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 110 may serve as an application layer 160. The application layer 160 may, for example, manage and provide policy data, threat data, and data inspection engines and dictionaries for the processing nodes 110.

Other application layer functions may also be provided in the application layer 160, such as a user interface (UI) front-end 130. The user interface front-end 130 may provide a user interface through which users of the external systems may provide and define security policies, e.g., whether e-mail traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other IP security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Figure 2:
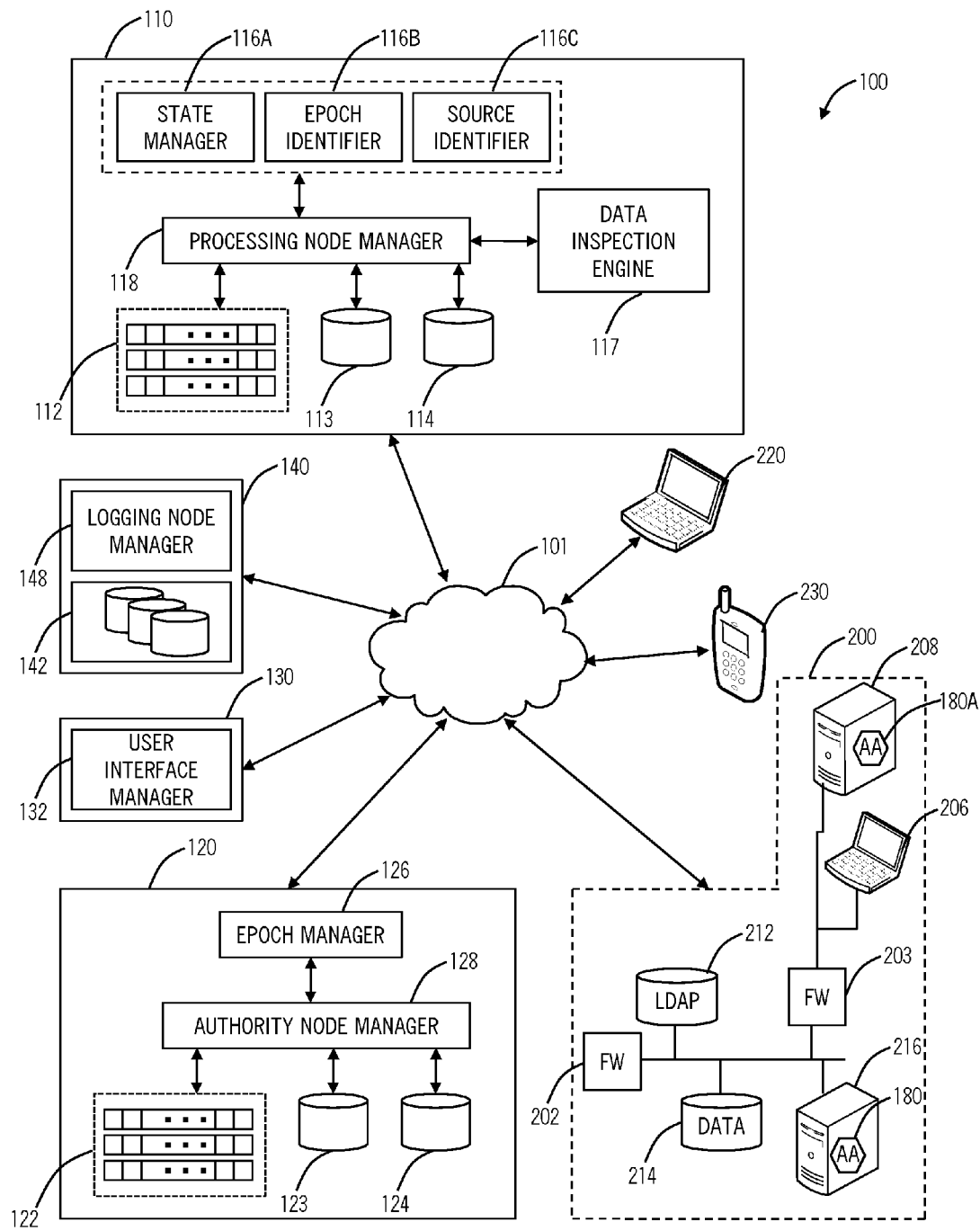
FIG. 2 is a block diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 cmay, for example, include a firewall (FW) 202 protecting an internal network that may include one or more enterprise servers 206, a lightweight director access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180b may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually negative. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam e-mail domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Referring to FIG. 3, in an exemplary embodiment, a block diagram illustrates a server 300 which may be used in the system 100 or standalone in performing phishing detection. Any of the processing nodes 110, the authority nodes 120, and the logging nodes 140 may be formed through one or more servers 300. Further, the computer device 220, the mobile device 230, the servers 208, 216, etc. may include the server 300. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 316 may be configured to implement the various processes, algorithms, methods, techniques, etc. described herein with respect to the system 100 and the like.

Figure 4:
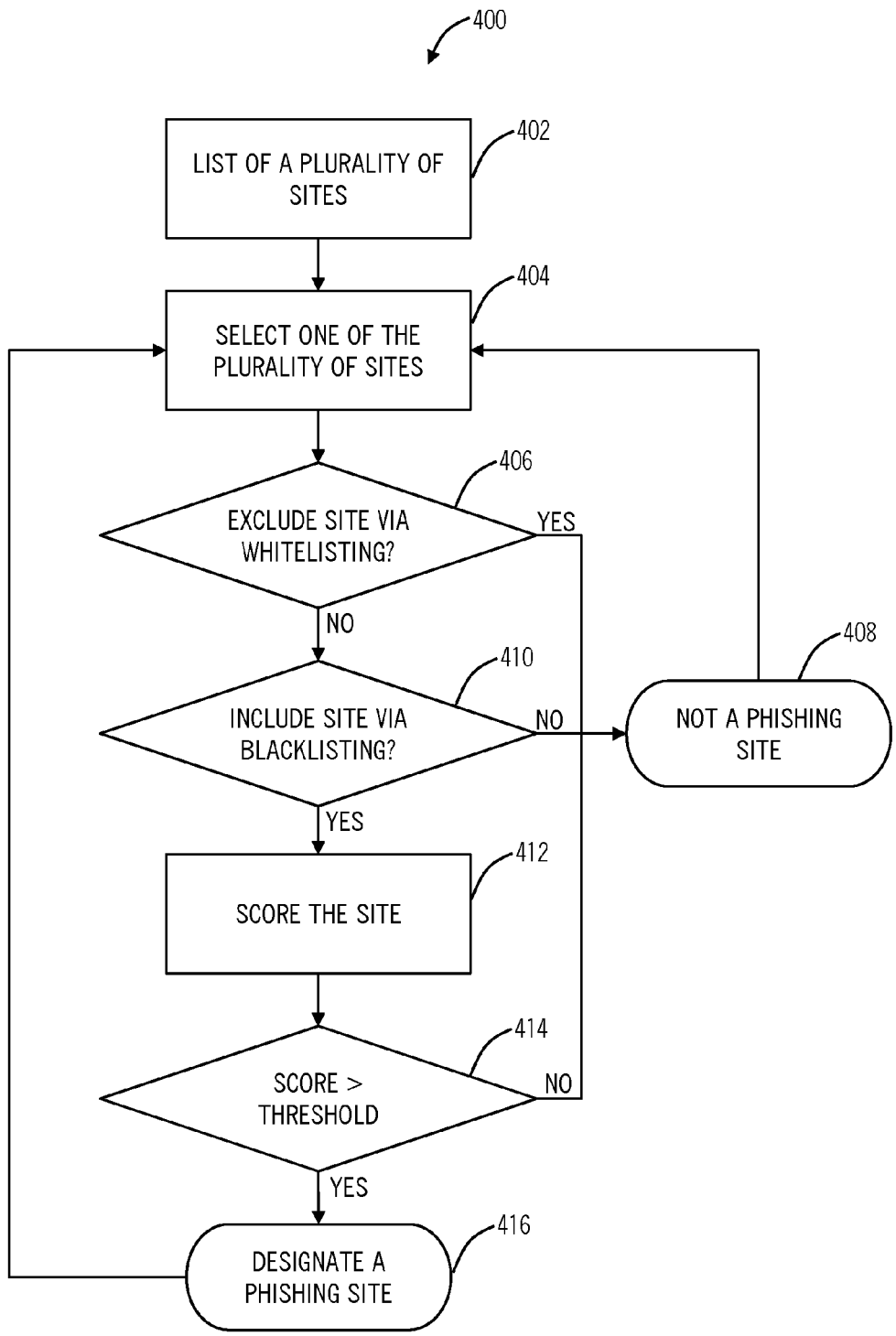
FIG. 4 is a flow chart of a phishing detection method for detecting phishing sites in a network, such as the Internet.

Referring to FIG. 4, in an exemplary embodiment, a flow chart illustrates a phishing detection method 400 for detecting phishing sites in a network. The phishing detection method 400 may be implemented by the system 100, the server 300, etc. to determine if various sites on the Internet or another network represent phishing sites. The phishing detection method 400 is a heuristic method that looks at a single transaction that is a client request plus a server reply to determine if a particular site is a phishing or masqueraded site. In an exemplary embodiment, the phishing detection method 400 may include Whitelisting steps that include a set of elements which dismiss a page as being a phish, Blacklisting steps that include a mandatory set of elements required on a page to be potential phish, and Scoring steps that include the presence of elements on a page to determine an overall phishing score of the page. For example, if a page meet all the requirements (Blacklisting), does not contain any whitelist element, has a score over a certain threshold, it may be considered a phishing page.

Some details must be know about the site that is a masquerade, such as its name (Paypal, Facebook, HSBC, Wells Fargo, etc.), the list of legitimate domains it uses (facebook.com, facebook.fr, etc.), a list of Cascading Style Sheets (CSS) class names used on the site (<a class="<CSS class name>"), etc. The phishing detection method 400 may include inspection done on the URL and hosts header of the client request, as well as on the headers and body of the server reply. Further, the Blacklisting, Whitelisting and Scoring steps may be done in any order. The phishing detection method 400 may begin with a list of a plurality of sites (step 402). For example, the sites may include Web pages with URL addresses or IP addresses. The list of the plurality of sites may be developed using the system 100, the server 300, etc. For example, the list may include historical sites visited by users. Also, the list may include sites identified in emails to the users, such as via scanning emails prior to delivery using the system 100 or the server 300. Here, adding sites in emails to the list may enable classification of the sites as phishing or not prior to users getting the emails and clicking through to the sites. Alternatively, the list of sites may be derived via any methods known in the art. The phishing detection method 400 selects one of the plurality of sites (step 404).

A first exemplary stage of the phishing detection method 400 utilizes whitelisting to initially determine if the site may be a phishing site or not (step 406). The whitelisting filter may be implemented on the selected site, or on all of the sites in the list at once. Whitelisting determines whether or not a page, domain, site, etc. can be considered a phishing site based one or more elements or tests. That is, the whitelisting excludes sites from being phishing sites. For example, a page cannot be considered a phish it contains at least one element of a whitelist, such as, for example, a domain name matches one of a plurality of legitimate domain names, an associated IP address is registered by a company whose names matches a legitimate company name, etc. The phishing detection method 400 may include a database or simple listing of the legitimate domain names or the legitimate company names. For example, www.google.com may be included in the legitimate domain names whereas www.google.example.com may not be included. Further, IP addresses registered to Google, Inc. may be included based on a review of DNS entries, WHOIS entries, etc. If the particular site is a whitelisted or excluded site, then this site is not a phishing site (step 408).

A second exemplary stage of the phishing detection method 400 utilizes blacklisting to initially determine if it is possible for the site to be a phishing site or not (step 410). Again, the blacklisting filter may be implemented on the selected site, or on all of the sites in the list at once. Blacklisting determines whether or not it is possible for a page, domain, site, etc. to be considered a phishing site based one or more elements or tests. That is, the blacking listing includes sites that could possibly be phishing sites based on meeting all of the one or more elements or tests. For example, a page cannot be considered a phish if one of the assertions of the blacklist is not true, such as, for example, the reply is a HyperText Markup Language (HTML) page, the page contains a legitimate name in the <title> tag, the page contains a <form> tag, for example. If any of the one or more blacklisting elements or tests is false or not met, the page may be excluded as not a phishing site (step 408). For example, a phishing site typically utilizes a legitimate name in the <title> tag while actually directing to another site. If the site does not include any <form> tags, then the site does not retrieve information from a user and thus is not a phishing site. The blacklisting relies on the client request (from a device implementing the phishing detection method 400) and the site's reply to the device.

If the site meets all of the one or more elements or tests in the blacklisting, a third exemplary stage of the phishing detection method 400 utilizes a scoring algorithm to examine the site to determine if it is a phishing site or not (step 412). In the scoring algorithm, points are assigned based on the presence of a set of elements. Similar to the blacklisting and possibly using the same data, the scoring relies on the client request (from a device implementing the phishing detection method 400) and the site's reply to the device. The number of points may be based on the number of time an element is seen on the page. The final score is the sum of all points. If the score is greater than a specific threshold (step 414), the page may be considered a phishing page (step 416).

In various exemplary embodiments, the set of elements in the scoring may be continually adapted based on evolving techniques used by phishing sites. Specifically, the set of elements in the scoring may be updated based on historical experience in the system 100, server 300, etc. Also, the set of elements in the scoring may be periodically updated by an administrator. In an exemplary embodiment with exemplary points, the set of elements may include, but not limited to: the presence of a legitimate name in the URL: +10 points; the presence of a legitimate name in the domain: +10 points; the domain name is an IP address: +20 points; the number of links (<a> tag) pointing to the legitimate domains of a masquerade site: +5 points for 5 elements, +10 points for 10 elements, +15 points for 15 elements; the number of external objects (images, favicons, style sheets, etc.) pointing to the legitimate +20 points for 10 elements, +15 for elements; yhe presence of a hidden iframe: +10 points; the number of class names matching the class name on the masquerade site: +20 points for 5 elements; the absence of a favicon: +10 points; the presence of some string in internal file names: +10 to +20 points; he presence of some strings in the HTML source: +10 to +20 points; the presence of inline JavaScript after the closing </html> tag: +15 points; and the like.

Figure 5:
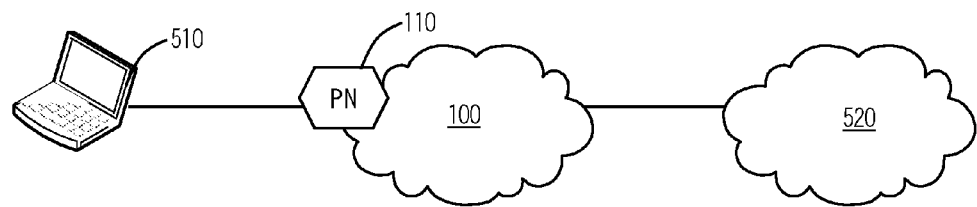
FIG. 5 is network diagrams of exemplary architectures between an end user and the Internet using the phishing detection method of FIG. 4.
Figure 5:
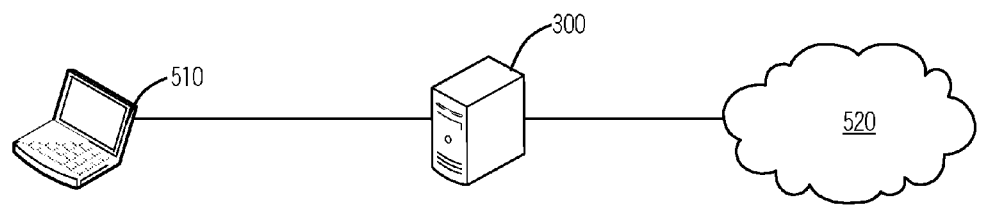
Figure 5:
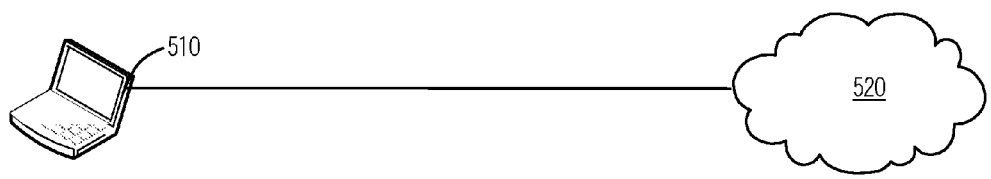

Referring to FIG. 5, in exemplary embodiments, network diagrams illustrate network architectures 500, 502, 504 of exemplary architectures between an end user 510 and the Internet 520 using the phishing detection method 400. The network 500 includes the end user 510 connected to the Internet 520 via the distributed security system 100. For example, the end user 510 may connect via one of the processing nodes 110. In this exemplary embodiment, the system 100 may implement the phishing detection method 400 and prohibit the end user 510 from accessing any site designated as a phishing site. For example, the phishing detection method 400 may be implemented by the processing nodes 110, the logging nodes 140, the authority nodes 150, or combinations thereof and a global database may include a list of all determined phishing sites with the processing nodes 110 prohibiting the end user 510 from accessing any site designated therein. Of note, the system 100 may utilize the processing nodes 110 to identify sites to include in the lists, such as based on incoming emails, etc.

The network 502 includes the end user 510 connected to the Internet 520 through a server 300, such as a DNS server, a firewall, a router/switch, etc. In an exemplary embodiment, the server 300 may be configured to implement the phishing detection method 400 and to prevent the end user 510 from accessing any phishing sites. In another exemplary embodiment, the phishing detection method 400 may be implemented by other devices besides those in the network 502 with a list generated of detected phishing sites and the list provided to the server 300. The server 300 may simply block access or provide warnings to the end user 510 upon a request to access any of the sites in the list. The network 504 includes the end user 510 directly connected to the Internet 520. In this exemplary embodiment, the end user 510 may directly implement the phishing detection method 400 or alternatively be provided the list. For example, the end user 510 may have a browser add-in or agent that prohibits access to any sites in the list.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A phishing site detection method, comprising:
  receiving, at a distributed security system comprising one or more computers configured to monitor all traffic to and from a protected system, a request for a site, where the distributed security system is external from the protected system, where the distributed security system monitors all the traffic at one or more processing nodes via a tunnel, a transparent proxy, a forward proxy, or redirection to the distributed security system, where the one or more processing nodes each comprise a detection processing filter to quickly detect via a guard table if the site has been checked as a phishing site; and
  if the site has not been checked as a phishing site, performing steps of:
  determining, via the distributed security system, if the site should be excluded as one of a plurality of phishing sites based on one or more exclusion elements;
  determining, via the distributed security system, if the site should be included as one of the plurality of phishing sites based on one or more inclusion elements;
  if the site is not excluded based on the first determining step and is not included based on the second determining step, scoring, via the distributed security system, the site based on a plurality of phishing elements to determine if the site is one of the plurality of phishing sites, where the scoring is performed based on the site having none of the one or more exclusion elements and none of the one or more inclusion elements, and the plurality of phishing elements comprise known phishing techniques;
  implementing the determining and scoring steps based on a single transaction comprising the request by a device in the protected system to the site and the reply received by the distributed security system from the site; and
  updating other processing nodes in the distributed security system with the plurality of phishing sites through one or more authority nodes in the distributed security system.

2. The phishing site detection method of claim 1, further comprising:
  determining the one or more exclusion elements comprising elements which one of the plurality of phishing sites cannot contain.

3. The phishing site detection method of claim 2, wherein the one or more exclusion elements comprise a domain name matching one of a plurality of legitimate domain names, an Internet Protocol address registered by an entity comprising one of a plurality of legitimate entities, and combinations thereof.

4. The phishing site detection method of claim 2, further comprising:
   determining the one or more inclusion elements comprising elements which one of the plurality of phishing sites must contain.

5. The phishing site detection method of claim 4, wherein the one or more inclusion elements comprise a HyperText Markup Language (HTML) page in the reply, the reply comprising a legitimate name in a HTML <title> tag, one or more HTML <form> tags in the reply, and combinations thereof.

6. The phishing site detection method of claim 4, further comprising:
   assigning relative weights to the plurality of phishing elements; and
   checking the reply to determine which of the plurality of phishing elements are present and an associated score based on the relative weights.

7. The phishing site detection method of claim 6, wherein the plurality of phishing elements comprise:
   presence of a legitimate name in a Uniform Resource Locator of the reply;
   presence of a legitimate name in the domain of the reply;
   a domain name of the reply is an Internet Protocol address;
   based on a number of HyperText Markup Language (HTML) links (<a> tag) pointing to legitimate domains of a masquerade site;
   number of external objects pointing to the legitimate domains;
   presence of a hidden iframe in the reply;
   number of class names matching a class name on the masquerade site;
   absence of a favicon in the reply;
   presence of some string in internal file names in the reply;
   presence of some strings in the HTML source in the reply; and
   presence of inline JavaScript after the closing HTML </html> tag in the reply.

8. The phishing site detection method of claim 1, further comprising:
   determining, via the distributed security system, a list of sites comprising the site based on inspection of data; and
   performing, via the distributed security system, the determining and scoring steps for each site in the list of sites.

9. The phishing site detection method of claim 8, further comprising:
   inspecting data utilizing a distributed security system; and
   identifying links to sites in emails, instant messages, and text messages for the list of sites.

10. A phishing site detection system, comprising:
    a plurality of processing nodes in a distributed security system comprising one or more computers configured to monitor all traffic to and from a protected system, where the distributed security system is external from the protected system, where the distributed security system monitors all the traffic at the plurality of processing nodes via a tunnel, a transparent proxy, a forward proxy, or redirection to the distributed security system, and where each of the plurality of processing nodes comprises:
    a data store;
    a network interface communicatively coupled to a network;
    a processor, where the data store, the network interface, and the processor are communicatively coupled therebetween, and where the processor is configured to:
    receive a request for a site from a device associated with the protected system;
    check if the site has been checked as a phishing site using a detection processing filter that quickly detects via a guard table whether or not the site has been checked; and
    if the site has not been checked as a phishing site, the processor is configured to:
    determine if the site on the network should be excluded as one of a plurality of phishing sites based on one or more exclusion elements, where the plurality of phishing sites is stored in a database in the data store;
    determine if the site should be included as one of the plurality of phishing sites based on one or more inclusion elements comprising in part absence of a favicon in a reply;
    if the site is not excluded based on the first determine step and is not included based on the second determine step, score the site based on a plurality of phishing elements to determine if the site is one of the plurality of phishing sites, where the site is scored based on the site having none of the one or more exclusion elements and none of the one or more inclusion elements, and the plurality of phishing elements comprise known phishing techniques;
    update the plurality of phishing sites based on the score step and distribute the update to other processing nodes through one or more authority nodes in the distributed security system; and
    implement the determine and score steps based on a single transaction comprising a request from the device and a reply received by the processing node from the site.

11. The phishing site detection system of claim 10, wherein the data store comprises the one or more exclusion elements comprising elements which one of the plurality of phishing sites cannot contain, the one or more inclusion elements comprising elements which one of the plurality of phishing sites must contain, and relative weights for the plurality of phishing elements.

12. The phishing site detection system of claim 11, wherein the processor is configured to updated each of the one or more exclusion elements, the one or more inclusion elements, the relative weights, and the plurality of phishing elements.

13. The phishing site detection system of claim 10, wherein the one or more exclusion elements comprise a domain name matching one of a plurality of legitimate domain names, an Internet Protocol address registered by an entity comprising one of a plurality of legitimate entities, and combinations thereof;
    wherein the one or more inclusion elements comprise a HyperText Markup Language (HTML) page in the reply, the reply comprising a legitimate name in a HTML <title> tag, one or more HTML <form> tags in the reply, and combinations thereof; and
    wherein the plurality of phishing elements comprise:
    presence of a legitimate name in a Uniform Resource Locator of the reply;
    presence of a legitimate name in the domain of the reply;
    a domain name of the reply is an Internet Protocol address;
    based on a number of links (HTML <a> tag) pointing to legitimate domains of a masquerade site;
    number of external objects pointing to the legitimate domains;
    presence of a hidden iframe in the reply;

number of class names matching a class name on the masquerade site;
absence of a favicon in the reply;
presence of some string in internal file names in the reply;
presence of some strings in the HTML source in the reply; and
presence of inline JavaScript after the closing HTML </html> tag in the reply.

14. The phishing site detection system of claim 10, wherein the processor is configured to
inspect incoming data from the network;
identify links to sites in emails, instant messages, and text messages from the incoming data; and
determine if the sites comprise one of the plurality of phishing sites.

15. A network security system, comprising:
a computer processing node communicatively coupled to a user and to an external network, where the processing node comprises a data store storing security policy data for the user, data inspection engines configured to perform threat detection classification on content to the user from the external network, and a manager communicatively coupled to the data store and the data inspection engines; and
a computer authority node communicatively coupled to the processing node, where the authority node comprises a data store storing security policy data comprising a list of phishing sites in the external network;
where the processing node and the authority node are part of a distributed security system externally located from the external network and configured to monitor all traffic to and from the external network and further configured to detect phishing sites and update the list of phishing sites based thereon, where distributed security system monitors all the traffic via a tunnel, a transparent proxy, a forward proxy, or redirection to the distributed security system;
where the processing node is configured to prevent the user from accessing one of the list of phishing sites by monitoring a request for a site and quickly determining whether or not the site has been checked as a phishing site using a detection processing filter that quickly makes a determination based on a guard table; and if the site has not been checked as a phishing site:
where the processing node is configured to, through a single transaction comprising a request for a site through the processing node and a reply from the site to the processing node, either whitelist, blacklist, or score the site for determining if the site belongs on the list of phishing sites based on known phishing techniques;
where the processing node, the authority node, or combinations thereof are configured to:
determine if the site should be excluded as one of a plurality of phishing sites based on one or more exclusion elements;
determine if the site should be included as one of the plurality of phishing sites based on one or more inclusion elements;
if the site is not excluded based on the first determine step and is included based on the second determine step, score the site based on a plurality of phishing elements to determine if the site is one of the plurality of phishing sites; and
update the list of phishing sites based on the score step.

16. The network security system of claim 15, wherein the processing node is configured to:
check the content for links to sites;
check if the links are on the list of phishing sites or a list of non-phishing sites;
if the links are not on the list of phishing sites or the list of non-phishing sites, perform the determine, score, and update steps for the links.

* * * * *